(12) United States Patent
Cahn

(10) Patent No.: US 8,275,991 B2
(45) Date of Patent: Sep. 25, 2012

(54) ON-LINE MEMBERSHIP VERIFICATION

(76) Inventor: Robert S. Cahn, Carmel, NY (US)

( * ) Notice: Subject to any disclaimer, the term of this patent is extended or adjusted under 35 U.S.C. 154(b) by 340 days.

(21) Appl. No.: 12/829,550

(22) Filed: Jul. 2, 2010

(65) Prior Publication Data

US 2011/0010553 A1 Jan. 13, 2011

Related U.S. Application Data

(60) Provisional application No. 61/270,574, filed on Jul. 10, 2009.

(51) Int. Cl.
*H04L 9/32* (2006.01)
(52) U.S. Cl. ........... 713/175; 726/5; 726/18; 380/282
(58) Field of Classification Search ............ 713/175; 726/5, 18; 380/282
See application file for complete search history.

(56) References Cited

U.S. PATENT DOCUMENTS

| | | | |
|---|---|---|---|
| 6,035,402 A | 3/2000 | Vaeth et al. | |
| 6,149,438 A | 11/2000 | Richard et al. | |
| 6,553,493 B1 | 4/2003 | Okumura et al. | |
| 6,714,944 B1 | 3/2004 | Shapiro et al. | |
| 6,754,829 B1 | 6/2004 | Butt et al. | |
| 7,263,491 B1 | 8/2007 | Geldermann et al. | |
| 7,383,232 B2 | 6/2008 | Fox | |
| 7,831,824 B2 * | 11/2010 | Abdulhayoglu | 713/156 |
| 7,900,247 B2 * | 3/2011 | Chong | 726/10 |
| 8,220,040 B2 * | 7/2012 | Botz et al. | 726/10 |
| 2004/0078564 A1 | 4/2004 | Abdulhayoglu | |
| 2006/0059332 A1 | 3/2006 | Adams et al. | |
| 2006/0277592 A1 | 12/2006 | Brown et al. | |
| 2008/0034211 A1 * | 2/2008 | Shull et al. | 713/175 |
| 2009/0177694 A1 | 7/2009 | Olson | |
| 2009/0327731 A1 * | 12/2009 | Appenzeller et al. | 713/171 |

OTHER PUBLICATIONS

Elliotte Rusty Harold, "Managing XML Data: Identify XML Documents File Extensions and MIME Types", IBM developerWorks article Apr. 29, 2005, Section 2: MIME media types; Table 2.

* cited by examiner

*Primary Examiner* — Krisna Lim
(74) *Attorney, Agent, or Firm* — Wendy W. Koba

(57) ABSTRACT

A system and method of providing on-line verification of various credentials without requiring second site authentication utilizes protocols and cryptography to assure customers (generally referred to hereinafter as "users") that they are dealing with a person (or organization) that can present multiple, non-repudiable proof of their identification. The system is launched directly from the user's browser such that certificate verification is performed "locally", without needing to go out and obtain information from a second web site. The system is based upon the creation of a new MIME (i.e. Multipurpose Internet Mail Extensions) type that is employed by the user's browser and utilizes public keys associated with the credentialing organizations in combination with a public key of the verification organization.

12 Claims, 8 Drawing Sheets

FIG. 3

```
pub  1024D/0AD456D8 2008-08-01 [expires: 2012-07-31]
uid  Yale University (No comment) <admin@yale.edu>
sub  2048g/7DADADEB 2008-08-01 [expires: 2012-07-31]
```

FIG. 4

```
sec  1024D/46184333 2008-08-01 [expires: 2012-07-31]
uid  Online Membership Inc. (Basic registration address) <registrar@onlinemembership.com>
sub  2048g/95AA43B0 2008-08-01
```

FIG. 5

```
pub    1024D/0AD456D8 2008-08-01 [expires: 2012-07-31]
uid    Yale University (No comment) <admin@yale.edu>
sig 3  0AD456D8 2008-08-01 Yale University (No comment) <admin@yale.edu>
sig    46184333 2008-08-01 Online Membership Inc. (Basic registration address)
           <registrar@onlinemembership.com>
sub    2048g/7DADADEB 2008-08-01 [expires: 2012-07-31]
sig    0AD456D8 2008-08-01 Yale University (No comment) <admin@yale.edu>
```

FIG. 6

```
<organization>Yale University</organization>  —— A
<group>Degree Holders</group>
<member>Robert S Cahn</member>
<website>www.robertscahn.com</website>  —— B
<information>
Enrolled 9/1966
Graduated 6/1970
Degree Awarded Ph.D
</information>
<expires>7/31/20  </expires>  —— C
```

FIG. 7

```
-----BEGIN PGP SIGNED MESSAGE-----
Hash: SHA1

<organization>Yale University</organization>  —— A
<group>Degree Holders</group>
<member>Robert S Cahn</member>
<website>www.robertscahn.com</website>  —— B
<information>
Enrolled 9/1966
Graduated 6/1970
Degree Awarded Ph.D
</information>
<expires>7/31/20  </expires>  —— C
-----BEGIN PGP SIGNATURE-----
Version: GnuPG v1.4.7 (GNU/Linux)

iD8DBQFIIFP/sjQZtwrUVtgRAiGXAJ9DDp3Jnl2e5fzIrvxm/g+We+zonACeJY7W
uN+KHv2MRMDqOkEkPcsgCOc=
=MFcS
-----END PGP SIGNATURE-----
```

*FIG. 8*

```
File Edit View History Bookmarks Tools Help
← ▾ C ⌂  ▌http://www.verify-membership.com/thomas-stuy.vm.cert.asc.php  ▾  G ▾
▌Most Visited ▾  ▌Getting Started  ▌WNYC - New York Pub...  ▌Latest Headlines ▾  ▌Flagler County COU...
```

The Certificate:
-----BEGIN PGP SIGNED MESSAGE-----
Hash: SHA1

<organization>New York City Public Schools</organization> ⸺ A
<group>Highschool Graduates</group>
<member>James Thomas</member>
<website>www.verify-membership.com</website> ⸺ B
<information>
School: Stuyvesant High School
Enrolled: 9-1978
Graduated: 6-1982
Degree Awarded: Regents Diploma
</information>
<expires>2009-9-30</expires> ⸺ C
-----BEGIN PGP SIGNATURE-----
Version: GnuPG v1.4.7 (GNU/Linux)

iD8DBQFI/OMWsiHARVi3qKERAvFqAKDhAyrj1+GJwcA3mT+9jfaHzVD7vQCeOi7q
IO16eOkrCtVPqb/BpOMcIIo=
=wunp
-----END PGP SIGNATURE-----

\- - - - - - - - - - - - - - - - - - - - - - - - - - - - - - - - - - - - - - - - - - - - - - - -

Your security phase is: A check the certificate is real ⸺ II
Valid host: www.verify-membership.com
Certificate processing:

Certificate expiration year=2009, month=9, day=30
The certificate has not expired
The signing key id is 58B7A8A1
gpg: Signature made Wed 22Oct 2008 11:13:26 AM EDT using DSA key ID 58B7A8A1
gpg: Good signature from "NYCity Public Schools (HS Graduation Certificate Key)"  ⸺ III
The organization, NYCity Public Schools is the same in the key and the certificate.
The signature is authentic
The signing key expiration date is 2009-10-22.
The signing key has not expired.
The key was signed by Online Membership, Inc.
The certificate is valid

The certificate is saved in the database.

Done

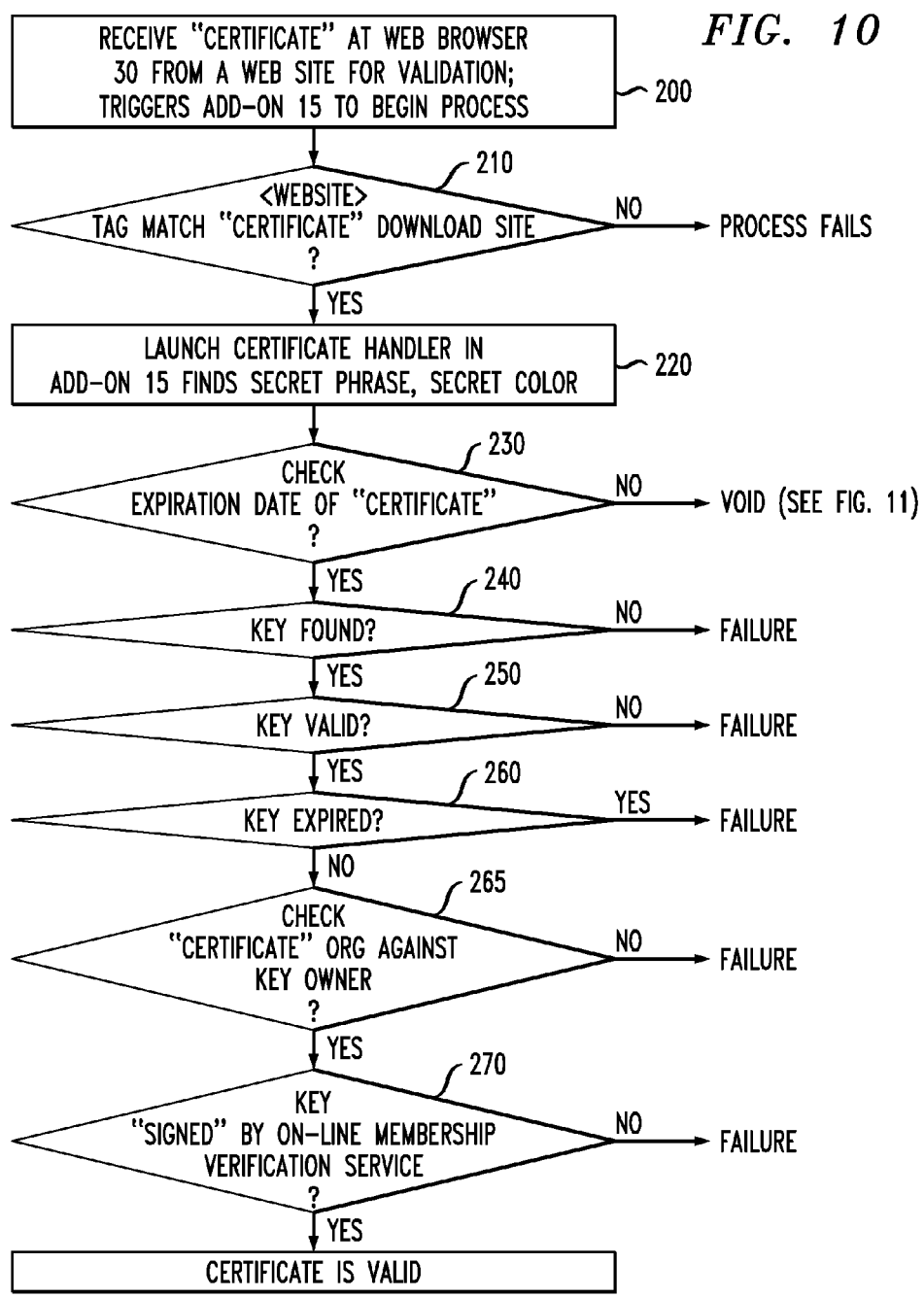

FIG. 11

```
File Edit View History Bookmarks Tools Help
← ▾ C ⌂ http://www.verify-membership.com/thomas-BBB.vm.cert.asc.php  ▾  G ▾
■ Most Visited ▾  ■ Getting Started  ■ WNYC - New York Pub...  ■ Latest Headlines ▾  ■ Flagler County COU...
```

The Certificate:
-----BEGIN PGP SIGNED MESSAGE-----
Hash: SHA1

<organization>Better Business Bureau of Westchester, NY</organization>
<group>Members in Good Standing</group>
<member>James Thomas</member>
<website>www.verify-membership.com</website>
<information>
Initiated: 7-2002
No Active complaints
</information>
<expires>2009-3-30</expires>
-----BEGIN PGP SIGNATURE-----
Version: GnuPG v1.4.7 (GNU/Linux)

iD8DBQFI//+k1+Ides8qR8QRArFFAJ9dZQFnql8/GkI3sjsFPVD/1MHXdACgmDBF
4ZlXeUEeA8B1YdYzmZH7R7w=
=RCsx
-----END PGP SIGNATURE-----
--------------------------------------------------------------------------------------------------------
Your security phase is: A check the certificate is real
Valid host: www.verify-membership.com
Certificate processing:

Certificate expiration year=2009, month=3, day=30
The certificate has expired. THE CERTIFICATE IS VOID.  ⌐─ D Done

ON-LINE MEMBERSHIP VERIFICATION

CROSS-REFERENCE TO RELATED APPLICATIONS

This application claims the benefit of U.S. Provisional Application No. 61/270,574, filed Jul. 10, 2009 and herein incorporated by reference.

TECHNICAL FIELD

The present invention relates to a system and method of providing on-line verification of various credentials without requiring second site authentication.

BACKGROUND OF THE INVENTION

The question of on-line identity has been an active area of research for a number of years. The question of whether a person or organization is who they claim to be has produced a number of web-based innovations. Often associated with on-line retailers, a web site may include a link to another site that purports to "verify" the authenticity of the on-line retailer. By clicking on the link, a user (such as a potential customer) is re-directed to another web page displaying the "certificate" of the on-line retailer. In general, these systems are referred to as "second site authentication" and have (unfortunately) been found to be relatively easy to forge. Domain names that are relatively similar to reputable "verification services" may be purchased by unscrupulous individuals who may then create 'fake' certificates and present them to unwary third parties looking for verification of a certain product or service. Simply put, good sites send you to other good sites for authentication, bad sites send you to other bad sites. Moreover, the proliferation of bad sites in the marketplace of second site authentication services remains problematic. While some browser add-ons may alert the user to "bad sites", this solution results in a race between the bad guys who create new bad sites, and the people who administer the add-ons and have the task of continually updating the identification of bad sites. Indeed, this approach is the same as the one used by parental control tools to warn of internet-based sexual material. Experience has thus shown that the race is never over, and there will always be ways to access untoward information.

One prior art attempt to address some of these problems is disclosed in US Patent Application Publication 2009/0177694, issued on Jul. 9, 2009 to Paul L. Olson. In this disclosure, a central repository is created for storing all authenticated credentials, where each credential is formed to include a checksum. An individual interested in reviewing a particular credential then accesses the repository, retrieves the desired credential and the checksum is calculated and presented for verification. The existence of a match is thus considered to authenticate the credential to the individual.

While an advance over the more general second site authentication processes, it is still possible for someone to implement the system of Olson so as to set up and maintain a "faux site" for holding fake credentials in a similar manner. One reason this is possible is that the originating organizations (e.g., professional associations, colleges, licensing organizations and the like) do not retain control of the certificates, but pass them off to the repository. Further, there is no indication that any kind of expiration of a credential is included with the data stored in the repository.

SUMMARY OF THE INVENTION

These and other limitations of the prior art are addressed by the present invention, which relates to a system and method for providing verification of various credentials to an independent person without the need to utilize a "second site" to perform the verification.

In accordance with the present invention, a system and method is provided that utilizes protocols and cryptography to assure customers (generally referred to hereinafter as "users") that they are dealing with a person (or organization) that can present multiple, non-repudiable proof of their identification. The system is launched directly from the user's browser such that certificate verification is performed "locally", without needing to go out and obtain information from another (perhaps unscrupulous) web site. An expiration date is preferably associated with each credential in order to ensure that the certificate is not "stale" and to create a fixed date upon which the certificate will expire.

It is an aspect of the present invention that the certificates provided by the system and method are difficult to forge or steal. While it is possible for a knowledgeable (i.e., computer-savvy) user to manually verify the authenticity of the certificate, the preferred embodiment of the inventive system is based upon the creation of a new MIME (i.e. Multipurpose Internet Mail Extensions) type that is employed by the user's browser and utilizes public keys associated with the credentialing organizations in combination with a public key of the verification organization. Unlike the prior art, the credentialing organization retains control of the certificate. It is further possible to allow multiple persons associated with the credentialing organization to sign-off on the credential, providing additional certainty that the certificate is genuine.

Beyond being verified by the on-line membership verification service, the system of the present invention is capable of including verification by other reputable, third-party verification services, thus providing multiple, separate levels of verification.

In one embodiment of the present invention, it is possible to control the establishment of certificates by requiring the on-line membership verification service to separately sign-off on each requested certificate from a specific organization.

Other and further aspects and embodiments of the present invention will become apparent during the course of the following discussion and by reference to the accompanying drawings.

BRIEF DESCRIPTION OF THE DRAWINGS

Referring now to the drawings,

FIG. 3 shows an exemplary public key associated with an organization;

FIG. 4 shows an exemplary private key associated with the on-line membership verification system and service of the present invention;

FIG. 5 shows an exemplary "signed public key", that is the public key of FIG. 3 upon signature by the private key of FIG. 4;

FIG. 6 shows an original "membership certificate" created by an organization

FIG. 7 shows a signed version of the membership certificate of FIG. 6;

FIG. 8 is an exemplary GUI of a certificate as expanded by the add-on and viewed by a user interested in validity a presented certificate;

FIG. 9 contains a listing of the parameters used to control the validity tests associated with the certificate handler process;

FIG. 10 is a flow chart of an exemplary process executed by the cert handler MIME type to check the authenticity of a presented "certificate"

FIG. 11 is an exemplary GUI created for an "invalid" certificate; and

DETAILED DESCRIPTION

Figure 1:
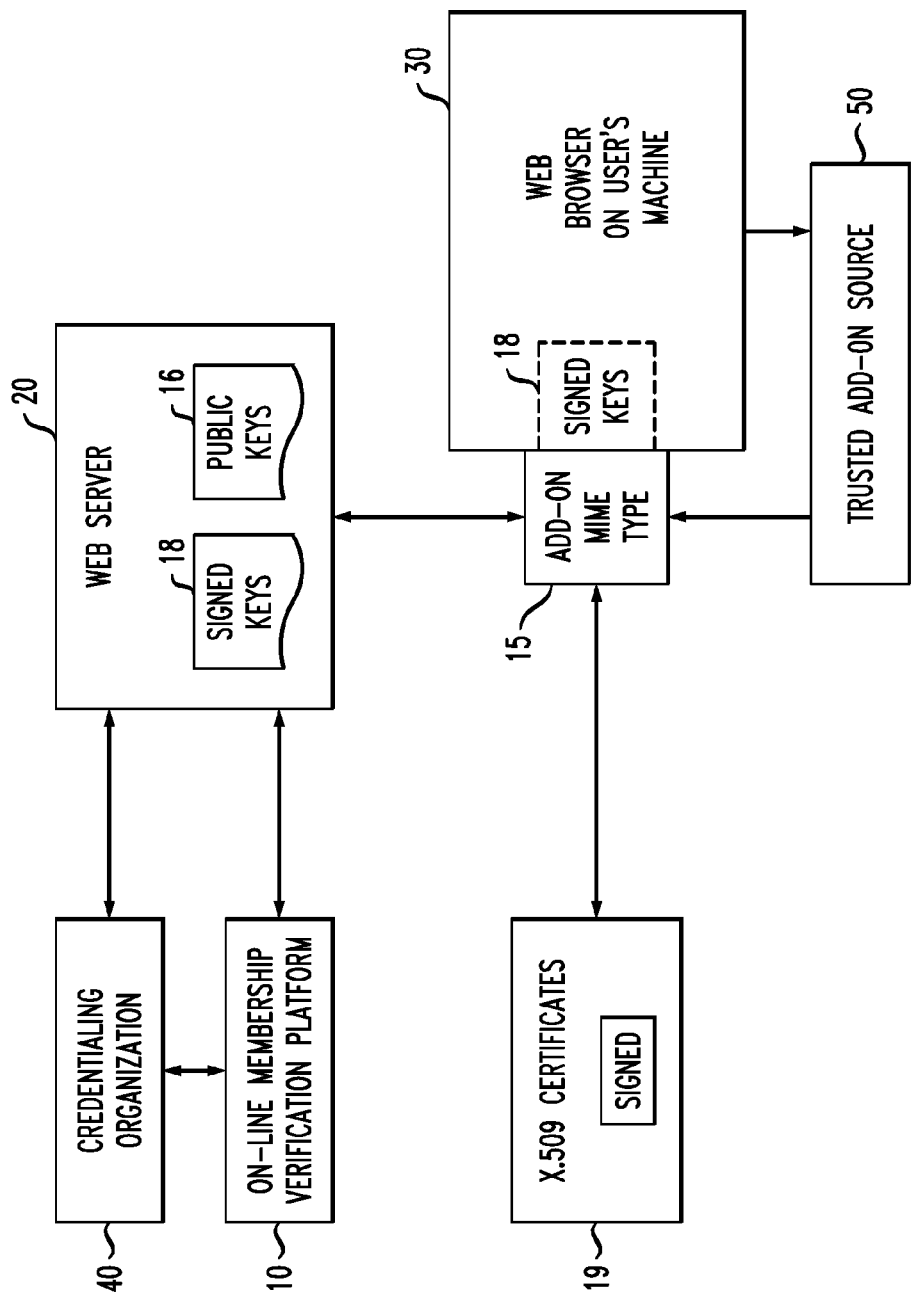
FIG. 1 illustrates an exemplary network arrangement for employing the on-line membership verification service of the present invention.

As will be explained in detail below and shown in FIG. 1, the on-line membership verification system 10 and method of the present invention is practiced within an environment including a web server 20 (for example, Apache) for storing public keys 16 and a web browser 30 (for example, Firefox) associated with a user attempting to verify an individual or organization 40. A significant aspect of the working of the present invention is the creation and use of "signed keys" 18—that is, public keys associated with organizations that have been verified and "signed off" by the inventive membership verification service. The process is similar, but not limited to, the creation of an X,509 certificate. These "signed" keys 18 are also stored in web server 20 and accessed, as needed, by the verification process of the present invention. The details of this procedure will be discussed in association with the following figures.

In particular, the first step in the inventive process is to install an add-on 15 for a user's web browser 30 that will execute a new MIME type handler (as described in detail below) that functions to download a current set of signed keys 18 onto the user's machine via web browser 30 and thereafter execute a process to determine the validity of a presented membership certificate. To implement this new MIME type, web browser 30 first accesses a trusted source 50 of add-ons (such as, for example, the site run by Mozilla for Firefox) and downloads add-on 15, as well as a file containing a current set of signed public keys 18 from web server 20. It is to be understood that the add-on code will not change (except for bug fixes and upgrades), but the list of signed public keys 18 will be frequently updated as old keys expire and new organizations subscriber to the on-line membership verification service. The install process is the same as that which is used for installing any add-on, and will include the registering of the new MIME type. The user's machine is now enabled to process certificates in an automated fashion.

Upon enablement, therefore, the user is able to verify a "certificate" that appears on a website of an individual or organization directly through his own browser 30 (without requiring access to 'second side' authentication). Every time the user starts his browser 30, add-on 15 is triggered and will search for an updated list of signed keys 18. Alternatively, the search for an updated list of signed keys 18 will be triggered by the first use of the add-on. If an updated list is found, it will be downloaded and installed on the user's machine in place of the previous version. Inasmuch as the keys will only be valid if signed by the on-line membership verification service, there is no concern about the injection of "false" keys.

The following paragraphs will first describe the process used by an organization to subscribe to the on-line membership verification service, followed by a description of the use of the service by someone desiring to authenticate the credentialing of an individual associated with a subscribed organization, or the credentialing of an organization itself (such as, for example, an on-line retailer).

Figure 2:
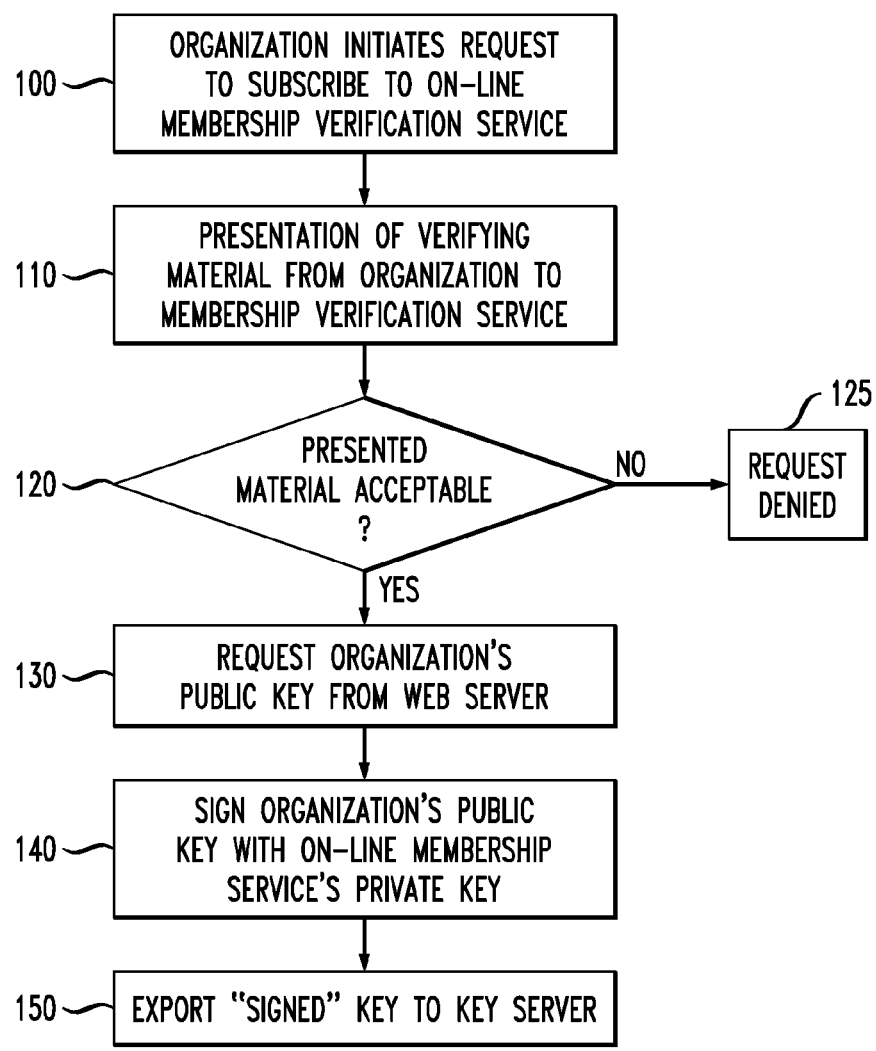
FIG. 2 contains a flowchart illustrating an exemplary process for allowing an organization to subscribe to the on-line membership verification service.

Setting Up an Organization to Participate in the Inventive On-Line Membership Verification System FIG. 2 contains a flowchart of the steps associated with the process followed by an organization desiring to subscribe to the on-line membership verification service of the present invention. The "organization" may be, for example, an educational institution (high school, college, medical school, law school, etc), a professional organization, a trade association, or any other group with whom an individual is associated. In many respects, the process is like that used by conventional Certification Authorities (CAs) to verify the identity of an organization, or that used by a commercial bank to verify an individual or organization prior to opening a bank account. Thus, referring to FIG. 2, a first step 100 is shown as an organization initiating a request to subscribe to the on-line membership verification service offered in accordance the present invention. The organization is then requested to present verifying material to the on-line membership verification service (step 110). The verifying material may include one or more items selected from, for example, Articles of Incorporation, notarized organizational papers, letters on company stationery including a corporate seal, references from other companies, etc. The specific types of verifying material are not pertinent to the operation of the on-line membership service of the present invention.

The on-line membership verification service then proceeds, in step 120, to review the presented verifying material and either accept the organization and approve the subscription, or reject their invitation. This is an off-line process performed by the service. If the presented material cannot be verified, the request is denied (step 125).

Assuming that the organization's subscription to the service is approved, the next step in the process (step 130) is for the verification service to launch a request for the organization's public key 16 to key server 20. FIG. 3 illustrates an exemplary public key for a subscribed organization (in this case, Yale University). The organization's public key 16 is then imported to on-line membership verification system 10 and signed by the on-line membership verification service with its own private key 17 (step 140). An exemplary private key 17 associated with the on-line membership verification service is shown in FIG. 4 and a "signed" public key 18 is shown in FIG. 5. Signed key 18 is re-exported to web server 20 (step 150) and added to the list of signed public keys. It is to be noted that the signature by the on-line membership verification service does not change the value of public key 16, as seen by comparing FIG. 3 to FIG. 5, but rather signifies that the initial public key 16 has been accepted by the on-line membership validation service as authentic. Thus, as organizations continue to subscribe to the on-line membership verification service, the list of active keys will continue to grow.

Preparing a Membership Certificate for a Verified Member

For the purposes of the present invention, it is presumed that each organization utilizes its own methods of "verifying" its members. For the sake of discussion, it is presumed that a graduate of Yale University would like to include this information on his website and requests a "membership certificate" from Yale (where Yale has previously subscribed to the on-line membership verification service as described above).

Yale then proceeds to create a membership certificate 70 for the requesting graduate, with an exemplary type of certificate payload 70 being as shown in FIG. 6. The three necessary components of certificate 70 are: (1) the identity of the credentialing organization (contained between the <organization> and </organization> tags and shown on line A of certificate 70); (2) the website with which the requested certificate will be associated (shown as <website> on line B of certificate 70); and (3) the expiration date of the certificate (shown as <expires> on line C of certificate 70). The other information included in exemplary certificate 70 of FIG. 6 is considered to be optional. The created certificate 70 is then digitally signed by Yale with its private key, rendering a "signed certificate" 72 as shown in FIG. 7. While a PGP signature is shown as associated with the private PGP key of Yale, any other suitable private key methodology may be used in accordance with the present invention to create a signed certificate 72. Created certificate is stored in a file, in this specific example a file called: yale-cahn.cert.asc. At this point, the MIME header is added. One exemplary way of doing this uses the PHP language, where the following lines are added at the beginning of yale-cahn.cert.asc to produce yale-cahn.cert.asc.php:

```
<?php
Header('Content-Type: text/x-mh');
?>
```

This file is then forwarded to the requesting individual for inclusion in his web site.

In reviewing signed certificate 72 of FIG. 7, it is to be noted that the expiration date of the certificate itself may be different from the expiration date of the organization's original public key 16 (compare FIG. 3—the expiration date of the certificate may be earlier, but not later than, the expiration date of the key). It is also important for signed certificate 72 to include an expiration date inasmuch as otherwise an "unending" certificate is created, where the credentialing organization then becomes hard-pressed to rescind or modify all outstanding certificates. That is, it may be possible that Yale (in this example) decides to issue more information in a future certificate, but without a certificate having an expiration date there may be multiple versions of the certificate floating around in the digital space of the internet.

Activating and Validating a Created Certificate for Users Visiting a Website

As noted above, a signed certificate 72, upon creation, is then included in the web site of the requesting individual (i.e., the authenticated member of the organization creating the certificate) and thereafter 'advertised' by the web site's owner (i.e., the "requesting individual") as available to confirm his/her authenticity. In fact, some sites may include several such certificates, some associated with educational institutions (e.g., verifying degrees earned), professional associations (e.g., affirming member-in-good-standing of the AMA), civic associations (e.g., Rotarian of the Northeast Region), business groups (e.g., member of local BBB).

While a signed certificate 72 may be accessible by very sophisticated users (i.e., knowledgeable about PGP and GPG) in order to verify the signature, most people visiting an individual's web site and desiring to confirm the authenticity of one or more certificates need further assistance. Thus, in accordance with the present invention, a MIME type ("certificate handler") has been created that allows for a signed certificate 72 to be opened and viewed by a user (i.e., a person visiting an individual's web site), where this MIME type is included in add-on 15 previously loaded onto the user's machine via web browser 30 as shown in FIG. 1 and discussed above. An exemplary graphical user interface (GUI) associated with this certificate handler process is shown in FIG. 8.

In accordance with the present invention, and as shown in FIG. 8, the certificate handler performs four specific tasks: (1) writes out the certificate for non-repudiation (shown as section in the GUI of FIG. 8); (2) writes out a locally-known (i.e., "secret") security phrase in a locally-chosen (i.e., "secret") color (shown as section II in the GUI of FIG. 8, where the shading in the drawing is intended to be indicative of the inclusion of color); and (3) writes out the results of the validity tests (shown as section III in the GUI of FIG. 8. The details of this process are controlled by the parameters shown in FIG. 9, which shows the location where the add-on will store the certificate listed in step (10, above, as well as the secret phrase and locally-chosen color. The secret phrase and locally-chosen color are used to avoid "playback attacks" and are local to the user's browser. Without this phrase, a bad website could simply provide a web page that looks like the verification page shown in FIG. 8. Therefore, unless the "secret phrase"—printed in the "secret color"—appears in the process of checking the certificate, the user will know that someone is trying to present a false certificate verification page to him.

The following steps outline the process performed by a user's web browser 30 when presented with a "certificate". At this point in time, the user has no idea whether or not the offered "certificate" shown on a web site being viewed is valid or invalid.

When add-on 15 receives a "certificate" from a web site being viewed by the user, a series of steps are performed as outlined in the flowchart of FIG. 10 to determine if the "certificate" is valid, or a forgery. As shown, the process begins at step 200 with receiving (from a web site being accessed) a certificate to be checked by add-on 15. Add-on 15 first checks (step 210) that the site specified by the <website> tag on the certificate matches the site from which the certificate was downloaded. If there is no match, the verification process fails. Indeed, this aspect of the process makes an authenticated certificate hard to steal and use on another web site. Depending on the browser's security policies, add-on 15 may then try and verify using the "browsing history" to ensure that the "previous page" is on the same site as that specified by the <website> tag (the "previous page" being the page containing the hyperlink that was clicked). If the browser allows such access, add-on 15 will verify the location of the previous page. If the browsing history verification fails, add-on 15 will report a "cross-link" failure and terminate the process. If the situation is such that the browser security policy does not permit this type of check, the user can be warned that his/her browser doesn't allow add-on 15 to access the history, and they should only regard the certificate as valid if they were visiting the site specified by the <website> tag. Going forward, it is expected that if add-ons do not allow access to the history object, the add-ons will be offered the ability to issue a query of the general form: query previous website(string). The browser will then return a TRUE(1) or FALSE(0), depending on whether or not the string represents the previous website. To further strengthen security, add-on 15 may be limited to issuing one such request per page load to minimize its ability to try and discover the path to the current certificate. If the response is TRUE, processing will continue; if it is FALSE, the processing will terminate and report a "cross-link" failure.

Presuming the tag and offering website match, the process moves forward to step 220 and launches the partial certification handler to perform the remainder of the validity tests (if using a local application), or merely proceeds to execute the rest of the code, if that code is within add-on 15. As mentioned above, by performing this check on the user's own machine, the inclusion of a secret phrase in a locally-chosen color in the testing process prevents non-legitimate sources from trying to pass off "bad" certificates. Referring to FIG. 10, the first of these remaining tests, shown as step 230, tests to see if the "current date" of the validity request is before or equal to the expiration date set by the <expires> tag on the offered "certificate". If it is determined that the "certificate" has expired, the process again fails. FIG. 11 is a GUI of an exemplary screen that is presented to the user upon failure of the "certificate" to pass this step in the process, as shown on line D of the "certificate" of FIG. 11.

Presuming that the certificate has not expired, the next step (step 240) proceeds to determine if a related signing key—signed by the credentialing organization—is in the cache supplied to add-on 15 by web server 20. At this stage, there may be an optional step where add-on 15 will go out to server 20 to see if the set of signed keys 18 is current. Should there be an updated set of keys, they will first be downloaded and the check will proceed against the new set of keys. If a key is not found, then the process will stop and be defined as a failure.

If found, signed key 18 is then checked (step 250) to determine if the signature is good (that is, the proper private key 18 is associated with the organization's public key 16) and that it has not expired (step 260). Lastly, the signed key is checked (step 270) to see if has been signed by an unexpired key of the on-line membership verification service (see FIG. 5). If this last test is passed, the certificate is defined as "valid". Otherwise, the user is informed that the certificate is invalid; the user is thus "warned" that he may be dealing with an unscrupulous individual/source.

The above-described validity tests as outlined in FIG. 10 are used to ensure that an unexpired certificate from a proper (i.e., previously-authenticated) site has been downloaded. Only after each one of these tests has been passed is the certificate accepted as "valid". It is to be understood that the specific order of these tests is not fixed; for example, one may check the signature first and check the website at the end of the process.

Advantageously, the validation process of the present invention is carried out by add-on 15 associated with the user's browser and does not require the individual to be directed to any other site for verification (i.e., no "second site" is involved in the validation process). The inclusion of expiration dates on the certificate, keys and signatures are considered to useful in preventing 'stale' certificates to remain in circulation.

Additional Features

It is possible that existing, commercially-available third party security services may desire to become associated with the on-line membership verification service of the present invention, thus providing additional levels of authentication to a specific certificate. In this case, the individual/organization is vetted by both the on-line membership verification service and any other associated third party security service, with the organization's public key then "signed" by each service. The certificate handler program is modified in this case to look for and test the signatures offered by each service. Alternatively, a different MIME type can be created specifically for handling multiple-signed keys.

In an alternative embodiment of the present invention, the on-line membership verification service may be configured to "sign" each individual certificate created by a specific organization, rather than perform a one-time sign-off on the public key of that organization. This embodiment may also be implemented in combination with the above-described multiple-signed keys, where the additional third party security service(s) may attest to only one or both of the signatures associated with the certificate.

Figure 12:
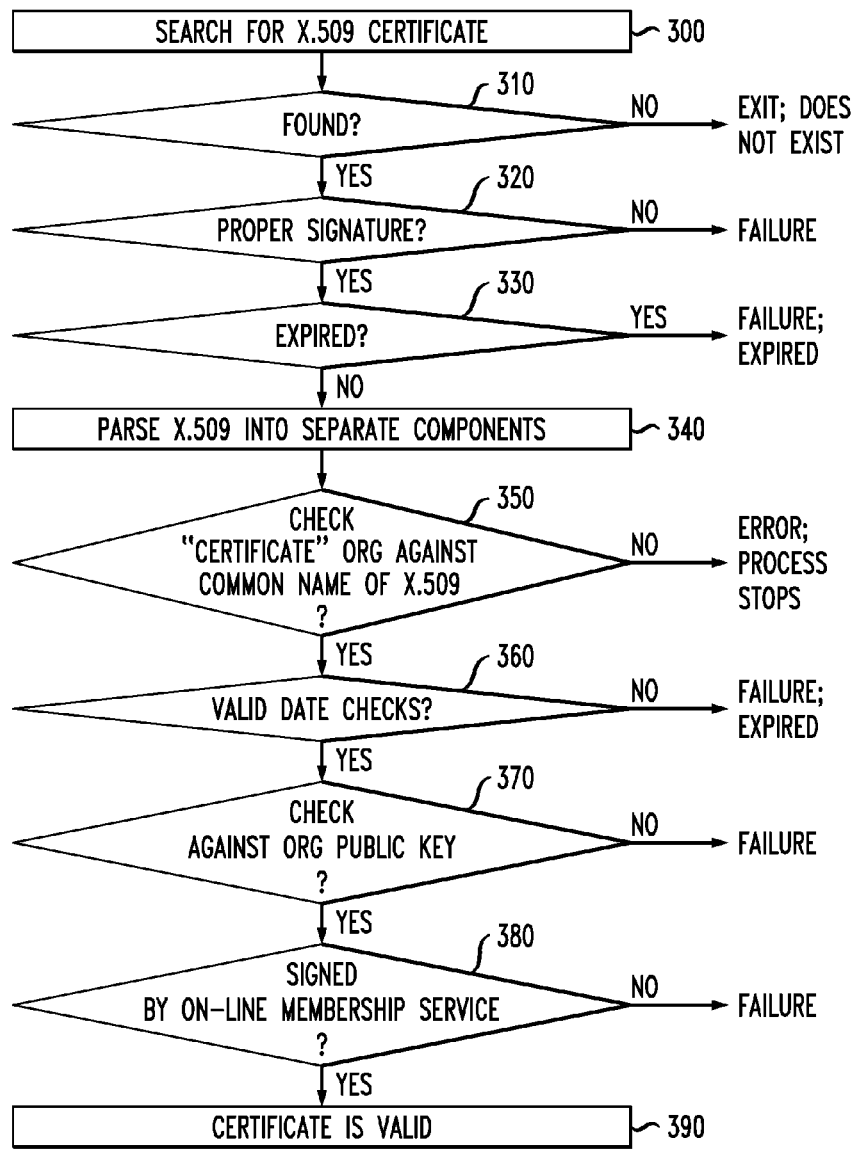
FIG. 12 is a flow chart of an exemplary process associated with using an existing X.509 certificate in association with the on-line membership verification service of the present invention.

Inasmuch as many organizations already have created and used X.509 certificates for other business purposes, they may desired to use these certificates in place of signed keys to create membership certificates in association with the present invention. In this case, the on-line membership verification system and service of the present invention operates in a slightly different manner. A presented X.509 certificate is itself signed with the private key of a known certificate authority. The X.509 certificate can be signed by the on-line membership verification service and stored in a database 19 created for such files (i.e., "signed X.509 certificates"). The cert handler then follows the process as outlined in the flowchart of FIG. 12.

As shown, the cert handler will first look (step 300) for the proper X.509 certificate in database 19 created as noted above. If a certificate is not found (step 310), the process will exit and the user will be advised that no proper validation exists. Otherwise, the process continues by checking for a correct signature from the originating organization (320). If either the certificate is not found, or the signature is not proper, the process fails and the failure is reported to the individual attempting to validate the certificate. Presuming a properly-signed X.509 certificate is found, its expiration date is checked (step 330) and the process continues if, and only if, the X.509 certificate has not expired.

The X.509 certificate is then parsed into its defined components (step 340) and the <organization> field of the "membership" certificate is checked (step 350) to see if it matches either the common name or organization listed on the X.509 certificate. If there is a mismatch, an error message is issued and the processing stops. The "validity" fields are then checked at step 360 and if the current time is not between the "not before" and "not after", an error message is created and issued. Presuming the certificate is valid, the signature of the certificate is checked using the public key of the issuing Certificate Authority (CA) in step 370 and, finally, the public key and key type of the organization is read and used to check the signature of the on-line membership verification service of the present invention. If the signature is valid, then a "verified" membership certificate is reported (step 390); otherwise, an error is indicated.

It is to be understood that the cert handler will still need to verify the <website> field against the URL of the page, or warn the individual reviewing the certificate to do so manually (as with GPG signatures).

A further extension of this service is in the area of verifying the education, work history, and other background of a job candidate. The job candidate creates a web site that can only be accessed by a password. When a prospective employer wants to check his or her background he wishes to know that the prospective employee is not masquerading as someone else. To prove control of the site the job candidate asks the prospective employer for a user id, password pair that they wishes to use. The job seeker then enables the user id, password for his or her web site and when the prospective employer logs on he or she can be assured that the person they have spoken with is the person described by the certificates on the web site. This password may be limited to one-time use or limited time use for purposes of maintaining confidentiality.

The present invention, as described above, is associated with an on-line membership verification service and system whereby organizations certify the credentials of a member for a given web site associated with the member. The service gives members the ability to provide their various organization affiliations to others using certificates signed by both the organization(a) and the on-line membership verification service provider. The inventive service does not require that the organization divulge their secret keys to the service. Multiple signers may be required to sign a key, providing additional certainty that the certificate is genuine. The inventive system includes code that is loaded onto client computers and that will be automatically invoked using the MIME handling mechanisms of browsers to check the validity of the certificate and, optionally, store the certificate on the local machine should some future problem arise.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A system for verifying certificates appearing on a web site purporting to certify a membership of the web site owner with a particular organization, the system comprising
    a data base of public keys associated with a plurality of public organizations, each organization capable of creating a web-based certificate containing an electronic signature of the organization;
    an on-line membership verification platform for downloading a selected public key from the data base of public keys and, upon verifying the authenticity of the organization associated with the selected public key, signing the public key to create a signed public key and re-exporting the signed public key to a data base of signed public keys;
    a MIME type available as an add-on for a local browser that, when triggered, will verify the validity of an offered "certificate", using as one input the data base of signed public keys, and provide a user with a graphical user interface (GUI) indication of either the validity or invalidity of the offered "certificate" without querying an additional site for validation.

2. The system as defined in claim 1 wherein the GUI indication supplied to the use includes a copy of the offered "certificate" and a locally-generated private message controlled by the user.

3. The system as defined in claim 2 wherein the locally-generated private message includes a locally-known, private phrase presented in a locally-selected color.

4. The system as defined in claim 1 wherein the validity checks performed by the MIME type include an expiration check of the offered "certificate", an expiration check of an associated public key (if found), a check for a "signed" version of the public key and an expiration of the signed key.

5. The system as defined in claim 1 wherein at least one additional verification service is used to sign the public key of an organization.

6. A method of verifying an on-line membership certificate presented by a web site owner, the method performed by an on-line membership verification service and comprising the steps of:
    a) receiving an offered "certificate" for evaluation from a website purporting membership in a predefined organization;
    b) comparing a <website> tag contained in the offered "certificate" to the website purporting membership and, if not the same, issuing a "failure" message, otherwise;
    c) evaluating the validity of the offered "certificate" and, if invalid, issuing a "failure" message, otherwise;
    d) obtaining a public key associated with the predefined organization;
    e) determining if the public key is valid and signed by the on-line membership verification service and, if invalid or not signed, issuing a "failure" message, otherwise
    f) presenting a statement to a user that the offered "certificate" is valid.

7. The method as defined in claim 6 wherein in performing step c), the evaluating includes the steps of:
    determining if the offered "certificate" contains an expiration date and, if so,
    checking the current date against the expiration date and if the "certificate" has expired, issuing a "failure" message, otherwise;
    determining if the offered "certificate" contains a valid signature from the predetermined organization and, if no signature is found, issuing a "failure" message.

8. The method as defined in claim 7 wherein in performing step e), the determining includes the steps of:
    determining if the public key contains an expiration date and, if so,
    checking the current date against the expiration date and if the key has expired, issuing a "failure" message, otherwise;
    determining if the key contains a valid signature from the predetermined organization and, if no signature is found, issuing a "failure" message.

9. The method as defined in claim 6 further including the step of creating a security step associated with a local machine performing the validity tests of steps b) and d).

10. The method as defined in claim 9 wherein the security step includes the steps of:
    creating a secret phrase; and
    presenting the secret phrase in a locally-known color as a portion of the presenting in step f).

11. A method of initiating a subscription to an on-line membership verification service certificate for an organization, the method comprising the steps of:
    receiving a subscription request for the on-line membership verification service from a requesting organization;
    reviewing verifying materials associated with the requested organization and assessing the validity of the organization and, if valid,
    downloading a public key associated with the organization from a public key data base;
    signing the public key with a private key associated with the on-line membership verification service to form a "signed" public key; and
    exporting the "signed" public key to a data base of signed public keys.

12. The method as defined in claim 11 wherein the method further comprises
    supplementing the signed public key with signatures from other third party verification services to add levels of security to the verification process.

* * * * *